Figure 1:
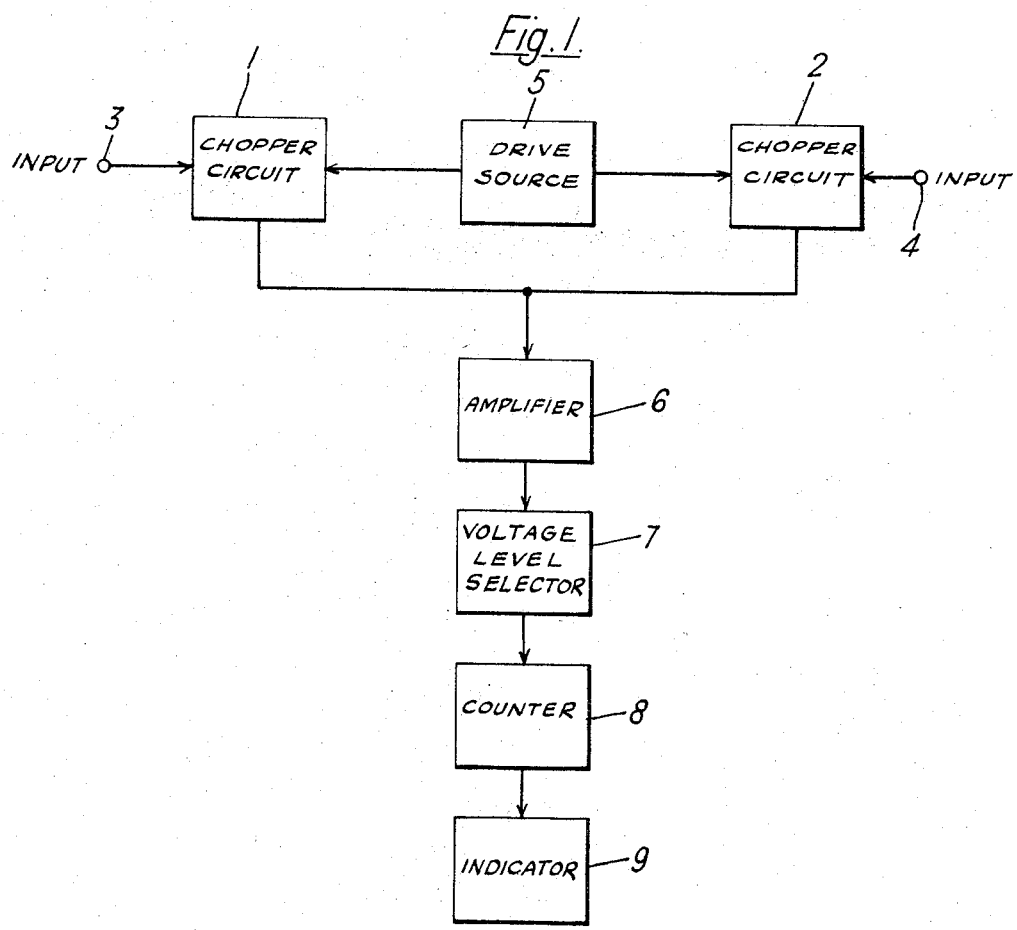

Aug. 29, 1967 W. L. GARFIELD 3,339,180
SIGNAL COMPARATOR FOR DETERMINING A PERCENTAGE
DIFFERENCE BETWEEN TWO SIGNALS
Filed Jan. 28, 1963 3 Sheets-Sheet 2
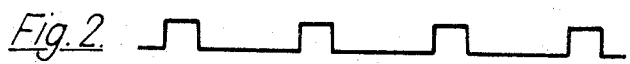
Fig. 2.
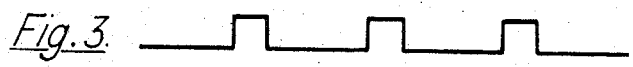
Fig. 3.
Fig. 4.
Fig. 5.
Fig. 6.
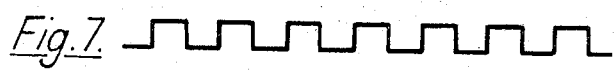
Fig. 7.
Fig. 8.
Inventor
WILLIAM L. GARFIELD
By 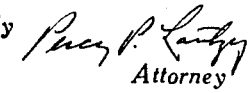
Attorney Aug. 29, 1967  W. L. GARFIELD  3,339,180
SIGNAL COMPARATOR FOR DETERMINING A PERCENTAGE
DIFFERENCE BETWEEN TWO SIGNALS
Filed Jan. 28, 1963  3 Sheets-Sheet 3
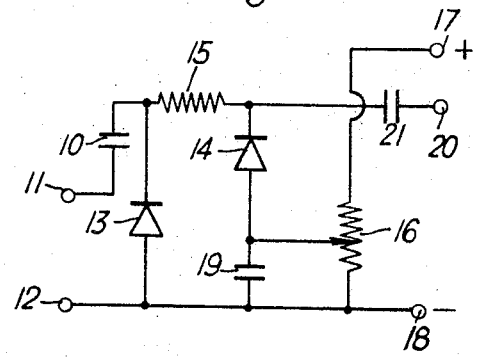
Inventor
WILLIAM L. GARFIELD
By  *Perry P. Lantry*
Attorney

United States Patent Office 3,339,180
Patented Aug. 29, 1967

3,339,180
SIGNAL COMPARATOR FOR DETERMINING A PERCENTAGE DIFFERENCE BETWEEN TWO SIGNALS
William Littery Garfield, London, England, assignor to International Standard Electric Corporation, New York, N.Y., a corporation of Delaware
Filed Jan. 28, 1963, Ser. No. 254,060
Claims priority, application Great Britain, Feb. 6, 1962, 4,460/62
7 Claims. (Cl. 340—169)

This invention relates to comparators for the purpose of determining when the percentage difference between the voltage levels of two electrical signals exceeds a particular amount.

According to the invention there is provided a signal voltage level comparator for comparing two signals including a source of two trains of pulses, each train having an amplitude dependent upon the voltage level of a different one of the two signals, means to interleave the pulses of the trains, means responsive to the difference in amplitude between the interleaved pulses, the amplitudes being taken with reference to a common voltage level, and means to produce a train of pulses whose frequency is determined by the said difference in amplitude.

The term "interleaved" as applied throughout this specification to the electrical pulses indicates that the pulses occur alternately in the two trains, that throughout the duration of each pulse of either of the trains no pulse occurs in the other train and there is a finite time interval between the termination of a pulse in one train and the commencement of a pulse in the other train.

An embodiment of the invention will now be described with reference to the accompaniying drawings in which:

FIG. 1 shows a schematic diagram of the embodiment,
FIGS. 2–13 show the waveforms of signals occurring at various points in the embodiment and
FIG. 14 shows a circuit diagram of a part of the invention.

Referring to FIG. 1 there are shown chopper circuits 1 and 2, having input signal feeds at 3 and 4, respectively. Each of the signal feeds 3 and 4 is connected to a different signal source. The chopper circuits 1 and 2 are driven by separate driving pulses obtained from a drive source 5.

The signal outputs from the chopper circuits 1 and 2 are combined at the signal input terminals of an amplifier 6. A voltage level selector 7 is coupled between the signal output terminals of the amplifier 6 and the signal input terminals of a counter circuit 8. The counter circuit 8 has output terminals connected to an indicator device 9.

The particular embodiment of the invention forms part of an airborne radio altimeter equipment. A frequency modulated signal is generated in the modulator of an altimeter transmitter and is radiated towards the ground. The radiated signal is reflected from the ground and picked up by a receiving aerial on the aircraft. The signal received by reflection from the ground is fed to an altimeter receiver, where it is beaten in a mixer stage with a second signal from the altimeter transmitter. This second signal reaches the receiver by transmission along a cable of known electrical length connected between the transmitter and the receiver. A frequency modulated beat frequency signal is extracted from the output of the mixer. The average frequency of the beat signal depends upon the altitude of the aircraft, and this is determined by counting the number of cycles of the beat frequency signal over a period equal to one cycle of the modulating frequency.

A counter of the cup-and-bucket integrator type is used to count the cycles of the beat frequency signal. Such a cup-and-bucket counter comprises a first capacitor (the cup) that is charged up on each cycle of the beat frequency signal, the charge then being transferred to a second capacitor (the bucket) for storage thereof. Now, first capacitor (the cup) is ready to receive the next cycle of the beat frequency signal. This process is repeated over a period of time equal to one cycle of the modulating frequency and the final charge on the second capacitor is proportional to the number of cycles of the beat frequency signal that occurred during said period of time. A direct voltage signal is obtained from the counter the level of which is indicative of the altitude of the aircraft. A monitor receiver is also provided in order to check the accuracy of the height information obtained from the altimeter receiver. One type of monitor receiver is described in our co-pending application No. 32,219/60 (Capelli 2). It is important to know when the percentage difference between the levels of the height signal and a direct current output signal from the monitor receiver system exceeds a given value.

The absolute values of the levels two signals are subject to variations of up to 100:1 between their maximum and minimum values. It has been found that comparison systems which rely on a null balance are undesirable as they are liable to produce erroneously good readings under some fault conditions.

The direct voltage signals representing the altimeter height signal and the output signal from the monitor receiver are respectively applied to chopper circuit 1 at the signal feed 3 and to chopper circuit 2 at the signal feed 4. The chopper circuits 2 and 3, of the type well known in the art, employ two transistors having a common collector load circuit and having the emitters connected to the two signal sources. The secondary winding of a pulse transformer is connected in series with the base of each transistor the primary winding of each transformer being connected to the chopper drive circuit 5.

The drive circuit 5 consists of a multivibrator having a repetition frequency of 2 kc./s. coupled to a frequency divider having a division ratio of 2:1. Two trains of rectangular pulses having a repetition frequency of 1 kc./s are interleaved in time relative to one another. These pulses are then applied through a gating circuit to the pulse transformers of the chopper circuits 1 and 2 respectively. From the signal output terminals of the chopper circuits two trains of interleaved pulses of rectangular waveform and each having a repetition frequency of 1 kc./s. are thus obtained. Means, other than chopper circuits, could be used to sample the signal voltage levels.

The waveforms of the drive pulses applied to chopper circuits 1 and 2 from the drive circuit 5 are shown at FIGS. 2 and 3, respectively.

The pulse trains produced in the chopper circuit are combined in the common collector load circuit to form a train of pulses of repetition frequency equal to 2 kc./s. and are fed via an emitter follower stage to the input of the amplifier 6. The waveform of the combined pulse trains is shown, at FIG. 4, for the case where the signals obtained from the altimeter and monitor receivers are of equal magnitude.

The amplifier 6 includes a class "A" transistor amplifier of a type well known in the art having an automatic gain control circuit comprising a transistor shunted across the input terminals of the amplifier, an A.G.C. amplifier and an A.G.C. rectifier. The A.G.C. amplifier is coupled to the signal output terminals of the class "A" amplifier and the A.G.C. rectifier is coupled to the A.G.C. amplifier and to the transistor shunted across the input terminals of the class "A" amplifier. The output signal from the class "A" amplifier is further amplified in the A.G.C. amplifier, rectified in the A.G.C. rectifier circuit and fed back as a base bias to the shunt transistor. Due to the action of the automatic gain control circuit, the total voltage excursion of the output signal obtained from the class "A" amplifier is found to remain substantially constant at 20 volts for a variation in the amplitude of a signal applied to the input terminals of 100:1.

It will be assumed firstly that the signals obtained from the altimeter and monitor receivers are of equal magnitude. The waveform of the output signal obtained from the amplifier 6 is as shown at FIG. 5, the total voltage excursion of the rectangular pulses being 20 volts.

The output signal from the amplifier 6 is coupled to the voltage level selector 7, a simplified circuit diagram of which is shown at FIG. 14. The voltage level selector has signal input terminals 11 and 12 which are connected to the signal output terminals of the amplifier 6 (FIG. 1). A diode 13 is connected across terminals 11 and 12 via a series capacitor 10. The cathode of the diode 13 is connected to the cathode of the diode 14 via a resistor 15. The anode of the diode 14 is connected to the slider of an adjustable potential divider 16 connected across the terminals 17 and 18 of a direct current supply, 18 being the negative terminal of the supply. The anode of the diode 14 is also connected to the negative terminal 18 via a decoupling capacitor 19. Terminal 18 is common with input terminal 12. The output signal from the voltage level selector is obtained across terminals 18 and 20 via a series capacitor 21.

The output signal from the amplifier 6 (FIG. 1) is coupled to the diode 13, which operates as a clamping diode, via the capacitor 10. The conductor joining terminals 12 and 18 is connected to ground potential. The voltage level at the junction of the capacitor 10, the resistor 15 and the diode 13 is therefore at earth or zero potential during negative excursions of the signal wave output signal from the amplifier 6 and remains at +20 volts during positive excursions of that signal.

The anode of the diode 14 is maintained at a steady positive potential with respect to ground, the magnitude of which depends upon the adjustment of the slider of the variable potential divider 16. The required positive potential, hereinafter referred to as the selection level, is determined by the maximum permissible percentage difference between the signals from the altimeter and monitor receivers. If, for instance, the maximum permissible difference between the two signals is equivalent to 10% of the larger of the two signals, then the slider of the potential divider 16 is adjusted for +18 volts at the anode of the diode 14. The diode 14 therefore conducts at all times when the level of voltage at the cathode is below +18 volts and is substantially non-conducting when the level of voltage at the cathode exceeds +18 volts. Under the assumed condition that the signals obtained from the output of the altimeter and monitor receivers are of equal magnitude, it follows that the level of the voltage at the cathode of the diode 14 is held at +18 volts, during negative excursions of the output signal from the amplifier 6, and rises to +20 volts during positive excursions of the signal. A "slice" of magnitude 2 volts is thus selected from the top of the amplifier output signal waveform. If, say, the maximum permissible percentage difference were 15%, then the potential at the anode of the diode 14 would be set to +17 volts, and a slice of magnitude 3 volts would be selected from the amplified signal waveform.

Referring to FIG. 6, the dotted line X represents the maximum level, 20 volts, of the clamped signal wave at the cathode of the diode 14, and the dotted line Y represents the selection level. FIG. 7 represents the waveform of the selected output signal, obtained across terminals 18 and 20. The maximum voltage excursion of this output signal is equal to the difference in level between +20 volts and the selection level. The repetition frequency of the pulse train at the output terminals 18 and 20 is the same as that of the combined pulse trains, i.e. 2 kc./s.

The pulse train from the output of the level selector circuit is coupled to the counter circuit shown at 8 in FIG. 1. The counter circuit includes a transition counter of the cup-and-bucket integrator type and since it is a requirement of counters of this type that the amplitude of the input signal remains constant, a limiting amplifier is inserted immediately in front of the counter. This arrangement renders the output obtained from the counter substantially independent of changes in the amplitude of the input pulses applied to it from the level selector circuit. The waveform of the amplified and limited signal fed to the counter 8 is shown in FIG. 8.

The counter provides a direct current signal which is proportional to the repetition frequency of the pulses applied to it from the output of the voltage level selector circuit. The direct current from the counter circuit 8 is fed to the indicator 9. The indicator consists of an alarm flag which is mechanically coupled to the armature of a relay. The relay is energised by the direct current signal from the counter and when the repetition frequency of the pulses applied to the counter is 2 kc./s., the magnitude of the energising current is sufficient to hold down the alarm flag.

The operation of the comparator when the magnitude signals from the altimeter and monitor receivers are not identical will now be described.

The waveforms of the drive impulses applied to the chopper circuits 1 and 2 will remain as shown at FIGS. 2 and 3. If it is assumed that the magnitude of the signal applied to the input terminals 4 of the chopper circuit 2 is less than that applied to the input terminals 3 of the chopper circuit 1, the waveform of the combined pulse trains at the input of the amplifier 6 will be similar to that shown at FIG. 9. The relative amplitudes of the pulses of the two trains depends upon the relative magnitudes of the current signals from the altimeter and monitor receivers.

The A.G.C. rectifier, which forms part of the amplifier 6, is responsive to the peaks of the combined pulse train amplified in the class "A" amplifier, and the gain of the latter is therefore determined by the magnitude of whichever is the larger of the two signals obtained from the altimeter receiver and the monitor receiver respectively.

The waveform of the output signal from the class "A" amplifier is represented at FIG. 10. The maximum excursion of the larger pulses is substantially fixed at 20 volts by the A.G.C. system, and again the ratio between the magnitudes of the pulses existing at the input terminals of the amplifier is preserved at the output terminals of the amplifier.

In the voltage level selector the 20 volt pulses will be clamped between voltage levels of 0 and +20 volts by the action of the diode 13 (FIG. 14). The excursion of the level of the smaller pulses will be between 0 volts and a positive potential which depends upon the difference in the magnitudes of the signals obtained from the altimeter and monitor receivers. If during the positive swings the voltage level of the smaller pulses rises above the selection level, that is to say the signals obtained from the two signals differ in magnitude by an amount less than the permitted maximum percentage difference, then output signals will be obtained from the voltage level selector 7 having a waveform similar to that shown in FIG. 7, except that alternate pulses will differ slightly in amplitude. The limiting amplifier included in the counter circuit removes the amplitude variations, however, and the waveform of the signal applied to the counter itself is similar to that shown in FIG. 8.

If the percentage difference between the magnitudes of the respective signals obtained from the altimeter and monitor receivers is greater than the permitted maximum, then the voltage level of the smaller pulses during the positive swings does not rise above the selection level, as is shown in FIG. 11, and the voltage at the cathode of the diode 14 is maintained at the selection level throughout the duration of each one of the smaller pulses, owing to the diode 14 remaining in the conducting condition. The voltage level at the cathode of the diode 14 therefore only changes when one of the larger pulses occurs, and the pulses at the output terminals 18 and 20 of the voltage level selector will have a repetition frequency of 1 kc./s. as shown at FIG. 13. After amplification and limiting in the counter circuit 8, the pulse train applied to the counter itself will be similar to that represented in FIG. 12.

The direct current obtained from the counter circuit output will now be only one-half of its normal value, corresponding to a pulse repetition frequency of 2 kc./s., and when passed through the alarm indicator relay windings is insufficient to hold up the relay and the alarm flag is raised.

If, for any reason, the input pulses to the counter fail completely or fall below the select level the alarm flag is also raised, owing to the failure of the relay energising current from the counter.

Although in this embodiment only one altimeter receiver is required to be checked against the monitor receiver, the invention could be applied to check two or more altimeter receivers against a monitor receiver. If, for instance, it is desired to check two altimeter receivers against a monitor receiver, three chopper circuits are required in order to produce three trains of interleaved pulses. The drive for the three chopper circuits can be obtained by well-known means. Assuming that the repetition frequency of the drive pulses applied to each of the three chopper circuits is 1 kc./s., then the repetition frequency of the combined train of interleaved pulses is 3 kc./s.

If the voltage level relationship between the three signals is such that percentage difference between the largest signal and the other two signals is less than a predetermined amount, then all three pulse trains have an amplitude at the voltage level selector equal to or greater than the selection level, and the repetition frequency of the pulses applied to the counter is 3 kc./s. If, however, one of the three signals falls below the level of the largest signal by more than the predetermined amount, the repetition frequency of the pulses applied to the counter 8 falls to 2 kc./s. In the event that two out of the three signals differ from the largest signal by more than the predetermined amount then the pulse repetition frequency at the counter falls to 1 kc./s. The indicator 9 is then arranged to provide an indication when the repetition frequency of the pulses applied to the counter falls below 3 kc./s.

The invention is capable of extension to the general case where it is required to know when the percentage difference between the voltage levels of any two out of N signals exceeds a particular value. Assuming that the repetition frequency of the pulses applied to the counter 8 from the output of the level selector 7 has a value F when the relative voltage levels of all the signals is within a predetermined percentage difference of the largest signal, then if the relative voltage level of the signals is such that one of the pulse trains at the level selector 7 is below the selection level, the repetition frequency of the pulse train applied to the counter 8 is $(N-1)/N \, F$. If, on the other hand, the relative voltage levels of the signals is such that only one of the pulse trains at the level selector 7 has an amplitude above the selection level, then the repetition frequency of the pulse train applied to the counter 8 is $F/N$.

In order for the invention to work properly it is necessary for the relative voltage levels of the signals to remain constant during the time required by the comparator to effect a comparison of the signals presented to it. In the embodiment of the invention previously described, although the absolute levels of the direct voltage signals obtained from the outputs of the altimeter and monior receivers are liable to variation in accordance with the height variations of the aircraft, the relative voltage levels of the signals do no change appreciably if the altimeter equipments are working properly.

Whilst in the embodiment described above it is convenient to use a chopper circuit drive frequency of 1 kc./s., in other embodiments of the invention it might be convenient to use some other chopping rate.

In applications of the invention where the absolute voltage level of the signals is fixed under normal operating conditions, the amplifier 6 of automatically controlled gain could be replaced by a simple linear amplifier having a pre-set gain.

What I claim is:

1. A signal voltage level comparator for comparing at least two signals comprising:
   a plurality of sources of analog electrical signals;
   sampling means coupled to said sources for deriving a train of pulses from each of said analog signals and for interleaving the pulses of said trains in time, each respective pulse of said trains having an amplitude dependent upon the voltage level of the portion of the analog signal from which derived;
   a voltage level selector network coupled to the output of said sampling means for providing output pulses when the levels of the input pulses thereto exceed a predetermined threshold value; and
   means coupled to the output of said voltage level selector for producing an output signal proportional to the number of output pulses produced by said voltage level selector network.

2. A signal voltage comparator according to claim 1 further comprising an indicator coupled to the output of said means for producing an output signal for indicating if the difference in amplitude between said two electrical signals exceeds a predetermined value.

3. A signal voltage level comparator according to claim 1 wherein said voltage level selector network includes means for adjusting the threshold value below which an output signal is not provided.

4. A signal voltage comparator according to claim 1 further comprising an amplifier circuit coupled between said sampling means and said voltage level comparator, said amplifier circuit having its gain controlled by the level of the pulses corresponding to the larger of said two analog electical signals.

5. A signal voltage comparator according to claim 4 wherein said voltage level selector network always produces an output pulse responsive to the interleaved pulses corresponding to the larger of said analog electrical signals and further comprises means for producing an output pulse responsive to the others of said interleaved pulses when their level exceeds said predetermined threshold value.

6. A signal voltage comparator according to claim 5 wherein said voltage level selector network further comprises means for adjusting said threshold value.

7. A signal voltage level comparator according to claim 1 wherein said sources of analog electrical signals comprises two analog electrical signals and wherein said sampling means includes:
   first and second chopper circuits coupled to said sources of analog signals, the outputs thereof being coupled to said voltage level selector network; and a driving source coupled to said first and second choppers for causing the output pulses from said two choppers to be interleaved in time.

References Cited

UNITED STATES PATENTS

| | | |
|---|---|---|
| 2,669,706 | 2/1954 | Gray. |
| 2,715,181 | 8/1955 | Glenn et al. _____ 328—117 |
| 3,019,392 | 1/1962 | Heacock. |
| 3,068,367 | 12/1962 | Brown et al. |
| 3,100,097 | 8/1963 | Woltersdorf. |
| 3,150,254 | 9/1964 | Wagner _____ 328—147 X |
| 3,214,700 | 10/1965 | Hook _____ 328—151 X |

FOREIGN PATENTS 128,537  8/1946  Australia.

NEIL C. READ, *Primary Examiner.*

D. YUSKO, P. XIARHORS, *Assistant Examiners.*